INVENTOR
WILLIAM R. KING

United States Patent Office 3,499,935
Patented Mar. 10, 1970

3,499,935
PRODUCTION OF DICHLOROACETALDEHYDE
AND TRICHLOROACETALDEHYDE
William R. King, Nixon, N.J., assignor to FMC Corporation, New York, N.Y., a corporation of Delaware
Filed July 2, 1965, Ser. No. 469,278
Int. Cl. C07c 47/06
U.S. Cl. 260—601
4 Claims

ABSTRACT OF THE DISCLOSURE

Product streams of pure DCA and chloral are obtained by reacting acetaldehyde or paraldehyde with at least about stoichiometric quantities of chlorine at from about 50–110° C. in the presence of a chlorination catalyst to obtain a mixture of both DCA and chloral containing substantially no monochloroacetaldehyde, in which the weight ratio of DCA to chloral is at least 0.06:1, distilling said mixture in a primary rectifying zone at a temperature no higher than about 180° C., separating high-boiling impurities as residue from the mixture, passing the overhead from the primary rectifying zone into a secondary rectifying zone, distilling the overhead stream from said primary rectifying zone at a temperature no higher than 120° C. to remove impurities more volatile than dichloroacetaldehyde, removing a second residue stream from said secondary rectifying zone and distilling this second residue stream in a tertiary rectifying zone at a pressure no higher than 0.25 and a temperature no higher than 50° C. to remove a purified dichloroacetaldehyde product stream overhead and a purified, chloral, residue stream from said tertiary rectifying zone.

---

Figure 1:
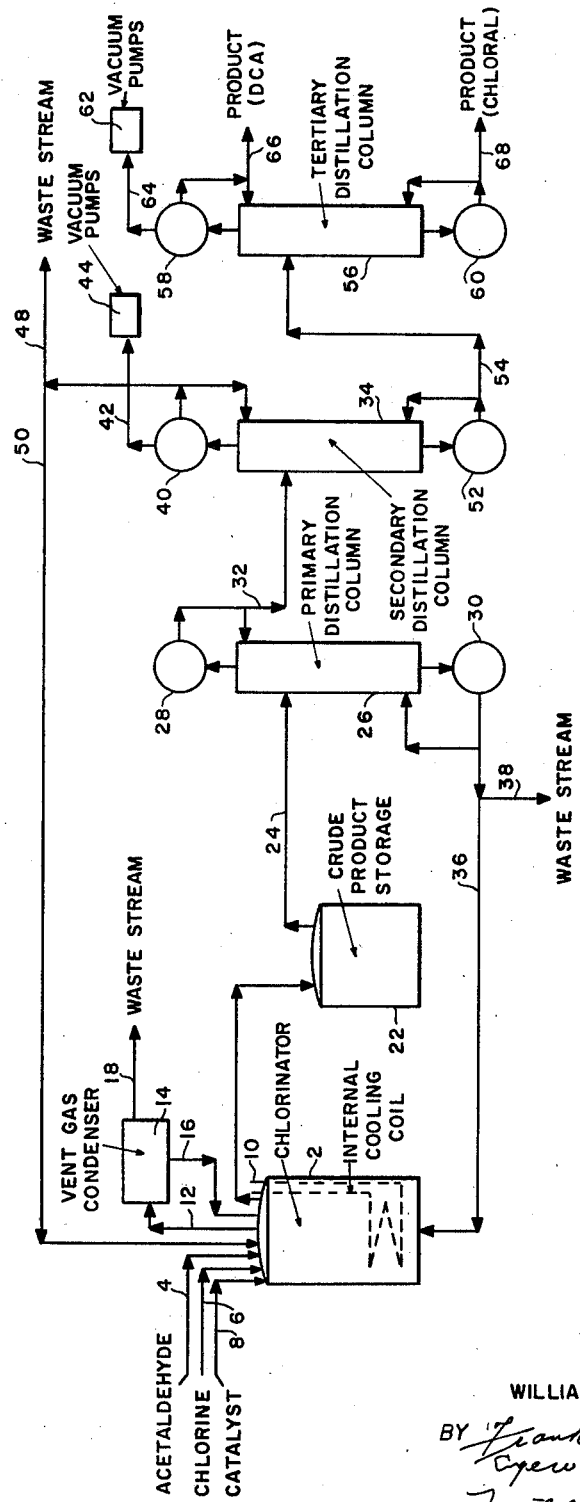

The present invention is concerned with a process for producing dichloroacetaldehyde (DCA) and trichloroacetaldehyde (chloral) by the chlorination of acetaldehyde or its cyclic polymers, and more specifically, to the production of DCA and chloral simultaneously and to the recovery of purified streams of these products.

In current methods of producing either DCA or chloral, acetaldehyde or one of its cyclic polymers, e.g. paraldehyde, is chlorinated under conditions that favor production of the desired product, i.e. either DCA or chloral. In producing DCA the chlorination normally is conducted in the absence of a metal chloride catalyst in order to chlorinate the acetaldehyde to DCA and to avoid further chlorination to chloral. In one such process the chlorination is carried out in two successive steps. In the initial step about stoichiometric quantities of chlorine are mixed in a first reactor with an acetaldehyde, e.g. either acetaldehyde or paraldehyde, at a temperature of 70–90° C. The partially chlorinated aldehyde is then transferred into a second reactor and there subjected to additional chlorination to obtain DCA with a minimum of chloral. The amount of chlorine which is added is regulated in accordance with the rate of the chlorination reaction. This can be measured by analyzing the effluent gases from the reactors to determine the quantity of hydrogen chloride and chlorine evolved. Under these mild chlorinating conditions undesired monochloroacetaldehyde (MCA) is obtained which is difficult to separate because it boils within three degrees centigrade of DCA.

In the production of trichloroacetaldehyde (chloral) the chlorination reaction is carried out in the presence of a chlorination catalyst such as antimony trichloride, so that the chlorination will proceed to the fullest extent and yield the trichlorinated product. This vigorous reaction avoids undesired MCA production but suffers the drawback of promoting the formation of high boiling impurities which are wasteful of both the aldehyde and chlorine feeds.

In general, the quality and assay of the product which is obtained in these processes is determined by the degree of control of the chlorination reaction. This reaction is difficult to control because it is exothermic, resulting in vaporization and resulting condensation of portions of the reactants, and because a number of side products can be produced simultaneously, including polymeric substances. Under such conditions of variable reaction temperatures and pot contents, thhe DCA or chloral product has wide uncontrollable amounts of contaminants.

Prior workers have attempted to purify the DCA or chloral product streams by conventional distillation. This is effective in separating most of the high boilers from the more volatile MCA, DCA or chloral, but this technique cannot be used to separate MCA, DCA or chloral from one another into products of commercially acceptable purity. These compounds have such similar volatilities that a satisfactory separation cannot be obtained by conventional distillation.

To offset this difficulty, processes have been devised which carry out the chlorination reaction in the presence of reaction promoters that direct chlorination towards one or the other product. In this way the chlorination can be more selective and either DCA or chloral, depending upon the product which is desired, can be obtained with decreased amounts of contaminants. One such process for selectively producing DCA with a minimum of MCA is described in copending application Ser. No. 263,410 filed on Mar. 7, 1963 in the names of Sidney Berkowitz and John Blumbergs.

Because of the above described difficulties there is presently a need for a process in which both DCA and chloral can be produced in a pure state and which does not depend solely upon control of the difficult chlorination reaction for obtaining commercially acceptable products.

It is an object of the present invention to satisfy the above need.

It is a further object to produce both DCA and chloral simultaneously by a process which permits obtaining purified product streams of these compounds with lower amounts of contaminants than has been obtained in commercial operations.

I have found that pure DCA and chloral can be obtained by reacting acetaldehyde or one of its cyclic polymers, e.g. paraldehyde, with at least about stoichiometric quantities of chlorine at a temperature of from about 50° C. to about 110° C. in the presence of a chlorination catalyst (preferably antimony chloride) for a period sufficient to form a mixture of both DCA and chloral containing substantially no MCA, said mixture containing a weight ratio of DCA to chloral of at least about 0.06:1 (preferably a weight ratio of 0.1:1 to 1:1), passing the mixture into at least one rectifying zone, distilling said mixture in said rectifying zone under an overhead pressure of no higher than about 0.25 atmospheres and removing a purified fraction of DCA product overhead from said rectifying zone at a temperature no higher than about 50° C., said DCA product having substantially lower amounts of chloral than the mixture fed to said rectifying zone, and removing a chloral fraction from the rectifying zone having substantially lower amounts of DCA and less volatile impurities than said mixture.

In addition, I have found that the present distillation technique can be used to separate DCA from chloral in any product stream containing these compounds.

In carrying out the preferred embodiment of the present invention acetaldehyde, or one of its cyclic polymers, e.g. paraldehyde, is fed continuously into a reactor along with chlorine and a chlorination catalyst. The chlorine is added in at least about stoichiometric proportions with respect to the aldehyde feed to form a mixed product of DCA and chloral. A slight excess of chlorine on the order of about 10% over the stoichiometric proportion has been found helpful in promoting the reaction.

The preferred chlorination catalyst is antimony trichloride although other catalysts such as the chlorides of iron, zinc, tin or phosphorous can be used. The catalyst can be added to the reactor as a chloride or in a form readily convertible to the chloride in the reactor.

The chlorination can be carried out in a single-stage reactor or in two stages. In either a single or two-stage process, chlorine is added to a reactor at a rate that corresponds to the rate at which the reaction takes place and HCl and unreacted chlorine gas are removed overhead. This reaction rate can be determined readily by measuring the concentration of chlorine and hydrogen chloride in the effluent gas stream from the reactor.

Since the chlorination reaction is exothermic, cooling means must be employed to maintain the reaction mixture at temperatures of no higher than about 110° C. and preferably between 70° and 90° C. The heat evolved during the exothermic reaction can be removed by indirect contact of the reaction mixture with a coolant passed through an internal cooling coil placed in the reactor. Alternately, a portion of the reaction mixture can be recycled through an external, indirect-contact heat exchanger. In addition, heat is removed from the system by vaporizing a part of the reaction mixture and then condensing these vapors and returning the condensate to the reactor.

As chlorination proceeds gases in the chlorinator which are evolved are cooled in an overhead condenser. This cooling, in addition to removing heat from the system, selectively condenses DCA and chloral from HCl and unreacted chlorine. The condensed DCA and less volatile compounds are returned to the reactor while HCl, unreacted chlorine and more volatile compounds are removed from the system as vent gases containing a minimum of DCA or chloral.

While cooling the overhead gas stream is the simplest method for removing waste gases without undue loss of the DCA and chloral values, an alternate method is to scrub the gas stream from the chlorinator with a solvent of low volatility that is relatively inert to the compounds found in the overhead gas stream. This solvent will extract the DCA and chloral values from the gas stream emanating from the reactor while allowing HCl, unreacted chlorine and more volatile compounds to be vented from the system. The resulting extract can be treated in a conventional stripping column for recovery of the DCA and chloral values from the solvent.

The chlorination is allowed to proceed until the reaction stream leaving the reactor contains no unreacted acetaldehyde (or cyclic acetaldehyde) or monochloroacetaldehyde, but not so far that the amount of DCA in the reaction stream falls below a weight ratio of DCA to chloral of 0.06:1. In this way, all of the acetaldehyde (or cyclic acetaldehyde feed) will be chlorinated beyond the MCA level, but the chlorination will not be extended so as to over chlorinate the acetaldehyde and form undue amounts of high boiling degradation products.

A crude DCA-chloral stream is removed from the chlorinator and passed into a primary distillation column equipped with an overhead condenser and a reboiler. The primary distillation column is run at maximum temperatures of 120° to 180° C. and preferably 140° to 180° C.; these temperatures result in substantially all of the DCA and chloral being driven off overhead, without thermal degradation of the products in either the column or the reboiler. In the primary column an overhead condensate is obtained containing DCA, chloral and those components which boil at temperatures lower than DCA and chloral; the residue is composed mainly of compounds which are less volatile than either DCA or chloral and include such materials as polymers and catalysts.

The overhead stream from the primary distillation column, enriched in DCA and chloral, is then passed into a secondary distillation column. This second distillation is conducted at a maximum temperature of about 120° C. and preferably at temperatures from about 60° C. to about 80° C., to obtain an overhead stream which contains substantially all of the components more volatile than DCA and chloral; a residue stream is obtained which contains substantially all of the DCA and chloral free of more volatile constituents. These temperatures are desired to minimize degradation of chloral and DCA in the residue stream. Such degradation must especially be avoided in this second distillation since the degradation products, which boil at a higher temperature than chloral, would remain with the DCA-chloral rich residue stream and eventually contaminate the chloral product. A subatmospheric pressure is required in the column to distill at the preferred temperatures of 60° to 80° C.

The residue stream from the secondary distillation column, rich in DCA and chloral, is then passed into a tertiary distillation column. This column is run under an overhead pressure no higher than about 0.25 atmosphere to vaporize an overhead stream of DCA at temperatures no higher than about 50° C. and preferably at from about 15° to about 50° C. By operating the tertiary distillation column in this manner, the DCA-chloral mixture is separated into an overhead stream of substantially pure DCA product and a residue stream of substantially pure chloral product.

It is critical that the tertiary distillation column be run under conditions in which the overhead DCA stream is recovered at temperatures no higher than about 50° C. At higher temperatures separation of the DCA from chloral becomes increasingly difficult. It is believed that a good separation of DCA from chloral is obtained at overhead temperatures no higher than 50° C. because of a change in the relative volatilities of these compounds.

In carrying out the distillation in the tertiary distillation column, overhead vapor temperatures lower than about 15° C. can be employed in separating DCA from chloral. However, to obtain distillation at lower temperatures, lower pressures are required. This necessitates using higher capacity, more expensive vacuum pumps. Further, when the overhead temperature in the tertiary distillation column falls substantially below about 15° C., the overhead condenser must be cooled with a refrigerated coolant in order to condense overhead vapors. This is undesirable from an economic standpoint because of the high cost of refrigeration equipment. Accordingly, while overhead distillation temperatures of below 15° C. can be used to effect DCA-chloral separation, they are generally not considered economically desirable.

In the preferred mode of operation described above the product stream from the reactor is treated continuously in a three-stage distillation system. However, the present distillation process can also be conducted in a batch type operation using only a single distillation column. In such batch operations, a portion of the reaction mixture from a chlorinator is fed into a single distillation column and heat is applied through a reboiler to commence vaporization of the mixture. The column is maintained at an overhead pressure no higher than about 0.25 atmosphere during the distillation of DCA from the reaction mixture. Further, the temperature at the base of the column should not exceed about 180° C. to minimize degradation of chloral.

In a batch distillation the vapors which are evolved overhead are condensed and a portion is returned to the column as reflux, while the remainder is withdrawn from the system as overhead fractions or "cuts." As distillation proceeds, the composition of the overhead system varies. This varying overhead composition can be separated according to its composition into cuts of the desired products.

In the present batch distillation, the initial fraction or cut is made up mainly of impurities boiling at a lower temperature than DCA and may contain a small amount of DCA and chloral. The second fraction which is removed from the distillation column is the DCA product cut. In order to obtain an acceptably pure DCA cut, the overhead temperature during this distillation should be maintained at no higher than about 50° C. by maintaining a sufficient subatmospheric pressure in the system.

The third fraction which is removed overhead from the column consists mainly of a mixture of DCA and chloral. As distillation proceeds the chloral content of the mixture increases. The fourth cut, consisting mainly of chloral is considered the chloral product cut. This cut can be distilled at overhead temperatures greater than 50° C. but the bottom temperatures should not exceed about 180° C.

The residue in the column is made up mainly of high boiling products and catalyst and some residual amount of DCA and chloral. The residue can be purged from the system or reused in a manner as set forth hereinafter.

Figure 2:
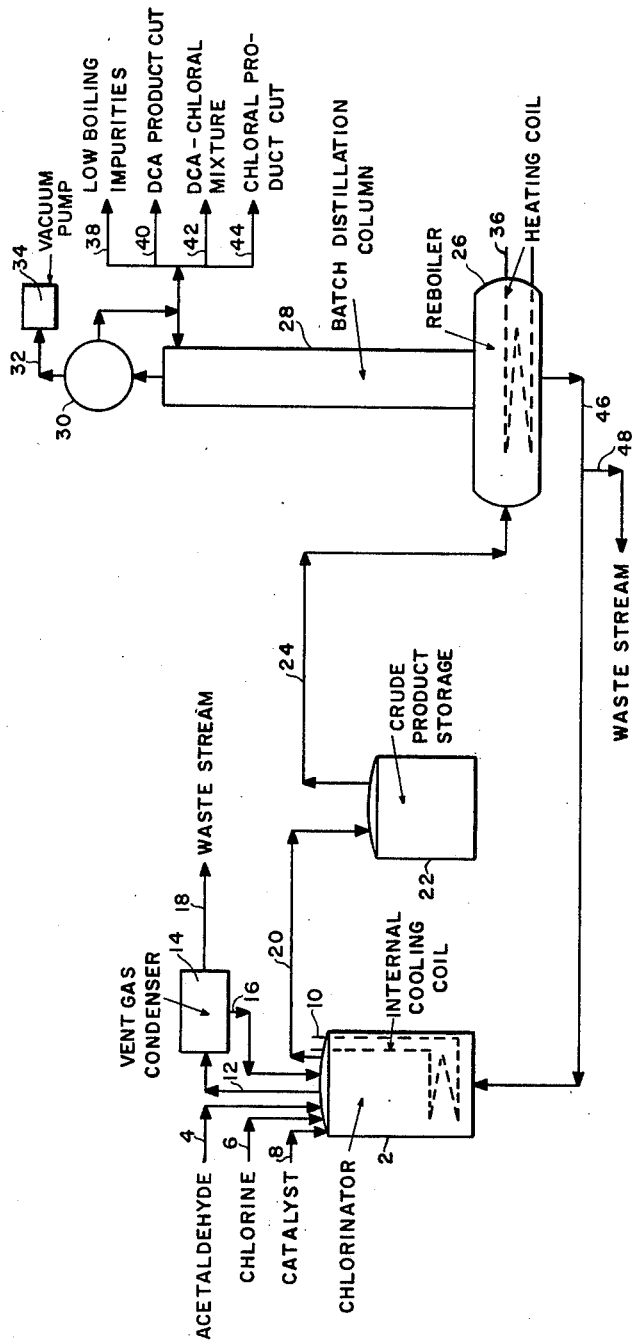

The invention will now be described more particularly by reference to the attached drawings. In the drawings:

FIG. 1 represents a diagrammatical flow sheet of an apparatus for use in carrying out the process of the present invention on a continuous basis; while FIG. 2 represents a diagrammatical flow sheet of an apparatus for use in carrying out the present process on a batch scale.

In FIG. 1 acetaldehyde is continuously fed into chlorinator 2 through conduit 4 along with chlorine through conduit 6. Simultaneously a catalyst, preferably antimony trichloride, is fed into chlorinator 2 through conduit 8 either continuously or intermittently. The reaction mixture in chlorinator 2 is cooled by means of internal cooling coil 10. Vapors from the chlorinator 2 are removed via conduit 12, cooled and condensed in condenser 14 and returned via conduit 16. Undesired waste gases mainly HCl are removed via conduit 18. The chlorinator 2 is maintained preferably at a temperature of 70–90° C. by the combined cooling effect of cooling coil 10 and condenser 14. The chlorine and acetaldehyde are added in about stoichiometric proportions sufficient to produce a mixture of DCA and chloral. The catalyst is maintained at a weight concentration of from about 1% to 4% in chlorinator 2. The product stream from the chlorinator containing DCA and chloral, in a weight ratio of DCA to chloral of at least 0.06:1 and preferably in a weight ratio of 0.1:1 to 1:1, is removed from chlorinator 2 via conduit 20. The product stream from conduit 20 is passed into a crude product storage tank 22. The crude DCA-chloral mixture is then removed from storage tank 22 through conduit 24 to the primary distillation column 26 equipped with a condenser 28 and a reboiler 30. The crude DCA-chloral feed stream is distilled in column 26 at a maximum temperature of 180° C. The overhead from column 26 containing DCA, chloral and compounds more volatile than DCA are condensed in condenser 28. A portion is refluxed back to the column while the remainder is passed through conduit 32 into a secondary distillation column 34. The residue of the primary distillation column 26 containing mainly high boiling compounds and some catalyst is recycled through conduit 36 back to the chlorinator 2. This recycle permits the catalyst in the residue stream to be reused for chlorination. Also, the recycled, higher boiling compounds act as a diluent in chlorinator 2 and permit better control of the chlorination reaction. If desired, a portion of the residue stream from the primary distillation column 26 can be removed from the system by conduit 38. In the secondary distillation column 34 distillation is conducted at a maximum temperature of about 120° C. and preferably at from about 60° to about 80° C. during which those compounds more volatile than DCA are condensed in condenser 40. When distilling at the preferred temperatures of about 60° to about 80° C., a subatmospheric pressure must be maintained in the column by conduit 42 connected to vacuum pump 44. A portion of the condensate is refluxed back to the column while the remainder is removed through conduit 46 and either discarded through conduit 48 or recycled through conduit 50 for further processing. The residue which collects in reboiler 52 comprises mainly DCA and chloral with substantially no higher boiling impurities than chloral or lower boiling than DCA. This residue is passed through conduit 54 into a tertiary distillation column 56. This column is equipped with a condenser 58 and a reboiler 60 and is maintained under subatmospheric pressure by vacuum pump means 62 connected to the column by conduit 64. Column 56 is run under a sufficiently low atmospheric pressure to condense a substantially pure DCA fraction in condenser 58 at a temperature no higher than about 50° C. The DCA condensate from condenser 58 is refluxed in part to the column while the remainder is removed via conduit 66 as product. The residue from column 56 is substantially pure chloral and is removed from reboiler 60 through conduit 68. Column 56 is operated preferably at a pressure sufficient to condense the DCA overhead at from about 15° to 50° C.; this normally requires atmospheric pressures on the order of about 0.05 to 0.25 atmosphere.

In FIG. 2 a chlorination is conducted in chlorinator 2 substantially in the same manner as set forth in the description given above for operation of the chlorinator in FIG. 1 except that the reaction is run batchwise. Acetaldehyde and chlorine are fed through conduits 4 and 6, respectively, into chlorinator 2 which contains a liquid heel. This heel can be made up of high or low boiling compounds, chloral, DCA or mixtures thereof. A catalyst is added through conduit 8 in amounts sufficient to maintain a concentration of about 1% to 4% in chlorinator 2. The reaction mixture in chlorinator 2 is cooled by means of an internal cooling coil 10 and by removing vapors from the chlorinator through conduit 12, condensing a portion in condenser 14 and returning the condensate through conduit 16. Undesired waste gases, principally HCl, can be vented through conduit 18. The reaction mixture is maintained at a temperature of about 70° to 90° C. by the combined effect of cooling coil 10 and condenser 14. The product from the chlorinator, containing DCA and chloral in a minimum weight ratio of DCA to chloral of 0.06:1, is removed from the chlorinator 2 through conduit 20 and passed into crude storage tank 22. The crude DCA-chloral mixture is then removed from storage tank 22 periodically through conduit 24 to the reboiler 26 of a distillation column 28 equipped with a condenser 30. The column 28 is maintained under subatmospheric pressure by means of conduit 32 connected to vacuum pump 34. A batch of the crude DCA-chloral mixture is then distilled by pulling a vacuum on the system by means of pump 34 and applying heat through heating means 36 to the crude mixture in reboiler 26. The vapors which are evolved are condensed in condenser 30 and a portion is returned to the column as reflux while the remainder is withdrawn from the system as overhead cuts, varying in composition as the distillation proceeds. The initial cut 38 is made up mainly of impurities boiling at a lower temperature than DCA. The second cut 40 is the DCA product cut and this cut must be removed overhead at a temperature no higher than about 50° C. in order to obtain a substantially pure DCA product. The required low overhead temperature is maintained by reducing the pressure in the column 28 to at least 0.25 atmosphere when distilling the DCA overhead. After a substantially pure DCA cut is recovered the temperature of distillation will rise and a third cut 42 will be obtained containing a mixture of DCA and chloral which increases in chloral content as the distillation proceeds. The fourth cut 44 is the chloral product cut. This cut should be distilled at a bottoms temperature no higher than 180° C. and preferably from 140° to 180° C. After substantially all of the chloral has been distilled the residue remaining in reboiler 26 which is made up of high boiling compounds and catalyst can be recycled through conduit 46 back to chlorinator 2 to be used as a heel in a subsequent run. A portion or all of the residue stream in conduit 46 can be removed from the system through conduit 48 to purge the system.

The following examples are given to illustrate the present invention and are not deemed to be limiting thereof.

EXAMPLE 1

Three chlorinators operating in parallel were fed gaseous chlorine at a rate of 4,878 lbs./hr. and liquid acetaldehyde at a rate of 1,115 lbs./hr. Antimony trichloride was added at periodic intervals to the chlorinators in amounts sufficient to maintain a concentration of about 1.5% by weight. The chlorinator temperatures were maintained at 80° C. by means of internal cooling coils and by vaporizing a portion of the reaction mixture and condensing and returning the condensates to the chlorinators. A stream, containing substantially all of the DCA and chloral formed in the reactors, was passed to a crude product storage vessel at a rate of 6,583 lbs./hr. The composition of the stream leaving the chlorinators analyzed as follows:

| Component: | Weight precent |
| --- | --- |
| HCl | .0001 |
| CCl$_4$ | .001 |
| DCA | .087 |
| Chloral | .511 |
| High boilers | .399 |

The crude product was pumped from the storage tank to a primary distillation column at a rate of 6,583 lbs./hr. The column was a packed column containing a stripping section, rectifying section, reboiler and condenser and was operated under a total pressure of about 0.51 atmosphere. The maximum temperature in the still was 176° C. The reflux rate was about 15% by weight of the feed rate and about 57% by weight of the feed was recovered as overhead product. The composition of the product stream is shown below.

| | Weight percent | |
| --- | --- | --- |
| Component | Overhead stream | Residue stream |
| HCl | .0019 | 0.0 |
| CCl$_4$ | .013 | 0.0 |
| DCA | .143 | 0.011 |
| Chloral | .840 | .068 |
| High boilers | .0006 | .920 |

A portion of the residue stream from the primary distillation column, containing high boilers and catalyst was returned to the chlorinators; the remainder was sewered. The overhead product from the primary distillation column was fed to a secondary distillation column which like the primary distillation column contained a stripping section, rectifying section, reboiler and condenser. The column was run at pressure of 0.5 atmosphere and at a maximum column temperature of about 80° C. The composition of the feed streams, overhead streams and residue streams is shown below.

| | Weight percent | | |
| --- | --- | --- | --- |
| Component | Feed stream | Overhead stream | Residue stream |
| HCl | .0019 | .020 | 0.0 |
| CCl$_4$ | .013 | .147 | .0005 |
| DCA | .143 | .182 | .136 |
| Chloral | .840 | .652 | .859 |
| High boilers | .0006 | 0.00 | .007 |

The residue stream from the secondary distillation column is then fed into a tertiary distillation column containing a stripping section, rectifying section, reboiler and condenser. The column was operated at an overhead pressure of about 0.15 atmosphere; at this pressure the temperature of the overhead vapors were no higher than about 40° C. A portion of the overhead stream was returned as reflux and the remainder was recovered as DCA product stream while the residue was recovered as the chloral product stream. The composition of the feed stream, overhead stream, and residue stream in this column are given below.

| | Weight percent | | |
| --- | --- | --- | --- |
| Component | Feed stream | Overhead stream | Residue stream |
| HCl | 0.0 | 0.0 | 0.0 |
| CCl$_4$ | .0005 | .003 | .00 |
| DCA | .136 | .910 | .014 |
| Chloral | .859 | .089 | .985 |
| High boilers | .007 | .00 | .0008 |

EXAMPLE 2

Into two chlorinators with a combined effective volume of 3,500 gallons and connected in parallel were fed 14,600 lbs. of chlorine and 3,360 lbs. of acetaldehyde over a 7-hour period. Antimony trichloride was added to the reaction mixture in amounts to hold catalyst contents from about 1.0% to about 2.0% by weight. The temperature of the reaction mixtures was maintained at about 80° C. by means of internal cooling coils and by condensing and returning the condensates to the chlorinators. Thereafter 14,250 lbs. of the reaction product was pumped to a crude product storage tank. The composition of the crude product is given below.

| Component: | Weight percent |
| --- | --- |
| HCl | .02 |
| Cl$_2$ | .02 |
| CCl$_4$ | .10 |
| DCA | .18 |
| Chloral | .50 |
| High boilers | .18 |

A portion of the crude product from the storage tank was pumped to a fractionating column having a reboiler and condenser. Heat was applied to the contents of the reboiler by means of an external heater and distillation was begun at an overhead column pressure of about 0.17 atmosphere. A number of overhead cuts were obtained and recovered. The average composition of the various cuts is given below in Table I.

TABLE I

| | Cut number (wt. percent) | | | | | | | |
| --- | --- | --- | --- | --- | --- | --- | --- | --- |
| Component | 1 | 2 | 3 | 4 | 5 | 6 | 7 | 8 |
| HCl | .250 | 0 | 0 | 0 | 0 | 0 | 0 | 0 |
| Cl$_2$ | .750 | 0 | 0 | 0 | 0 | 0 | 0 | 0 |
| CCl$_4$ | 0 | .960 | .760 | .048 | 0 | 0 | 0 | 0 |
| DCA | 0 | .030 | .158 | .894 | .533 | .246 | .008 | 0 |
| Chloral | 0 | .010 | .082 | .058 | .467 | .754 | .987 | .014 |
| High boilers | 0 | 0 | 0 | 0 | 0 | 0 | .005 | .986 |

Cut No. 1 represents noncondensable vapors from the still. Cut No. 2 which contains the bulk of the carbon tetrachloride was sewered. Cuts No. 3, 5 and 6 were recycled to the reactors for use as a heel in conducting further chlorination reactions. Cut No. 4 is the DCA product cut and was obtained at an overhead temperature of about 40° C. Cut No. 7 is the chloral product cut and was recovered overhead at a temperature of about 47° C. Cut No. 8 is the high boiling components which remained as residue in the still and was not distilled overhead. A portion of this fraction containing high boilers and catalyst was returned to the chlorinator while the remainder was sewered. The various cuts set forth above were obtained during a four-hour distillation.

EXAMPLE 3

A 214 g. mixture of DCA and chloral containing about 82% DCA was fed to a laboratory batch distillation column containing about 40 theoretical plates. The distillation column was made up of two separate fractionating sections connected together one above the other. On the uppermost plate of the lower fractionating section the pressure was 0.24 atmosphere and the temperature was about 57° C. On the uppermost plate of the second, upper section of the fractionator the pressure was 0.205 atmosphere and the temperature was about 48° C. The overhead product from the column contained 0.96 weight percent of DCA while the residue contained 0.028 weight percent of DCA.

EXAMPLE 4

The process of Example 1 was conducted with an equivalent amount of paraldehyde in place of acetaldehyde. The results obtained were substantially the same as those in Example 1 with no substantial difference in purity of the products.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. A process for producing both dichloroacetaldehyde and chloral which comprises reacting a compound selected from the group consisting of acetaldehyde and paraldehyde with at least about stoichiometric amounts of chlorine at a temperature of from 50° to 100° C. in the presence of a chlorination catalyst selected from the group consisting of the chlorides of antimony, iron, zinc, tin and phosphorous for a period sufficient to form a mixture of both dichloroacetaldehyde and chloral containing substantially no monochloroacetaldehyde and substantially no unreacted member selected from the group consisting of acetaldehyde and paraldehyde, said mixture containing a weight ratio of dichloroacetaldehyde to chloral of at least 0.06:1, passing said mixture into a primary rectifying zone, distilling said mixture in said primary rectification zone at a temperature no higher than 180° C., removing a first overhead stream containing substantially all of the dichloroacetaldehyde, chloral and more volatile compounds in said mixture, removing a first residue stream of high boiling impurities which are less volatile than chloral, passing said first overhead stream into a secondary rectifying zone, distilling said first overhead stream in said secondary rectifying zone at a temperature of no higher than 120° C., removing a second overhead stream containing impurities more volatile than dichloroacetaldehyde, removing a second residue stream containing dichloroacetaldehyde and chloral free of more volatile impurities, passing said second residue stream into a tertiary rectifying zone, distilling said second residue stream in said tertiary rectifying zone at an overhead pressure no higher than 0.25 atmosphere and removing a purified dichloroacetaldehyde product stream overhead from said tertiary rectifying zone at a temperature no higher than 50° C., said dichloroacetaldehyde product stream having a substantially lower amount of chloral than said second residue stream, and removing a purified chloral stream as residue from said tertiary rectifying zone having substantially lower amounts of dichloroacetaldehyde than said second residue stream.

2. The process of claim 1 in which the distillation in said primary rectifying zone is conducted at a temperature of from 120° to 180° C., the distillation in said secondary rectifying zone is conducted at temperatures of from 60° to 80° C., the distillation in said tertiary rectifying zone is conducted at overhead pressures of from 0.05 to 0.25 atmosphere and the dichloroacetaldehyde product stream is distilled overhead at a temperature of from 15° to 50° C.

3. A process for separating dichloroacetaldehyde and chloral from one another in a product stream containing said dichloroacetaldehyde, said chloral, impurities less volatile than chloral and impurities more volatile than dichloroacetaldehyde, which comprises passing said product stream into a primary rectifying zone, distilling the mixture at a temperature of from 120° to 180° C. and removing a first overhead stream containing substantially all of the dichloroacetaldehyde, chloral and more volatile compounds in said product stream, removing a first residue stream of high boiling impurities which are less volatile than chloral, passing said first overhead stream into a secondary rectifying zone, distilling said first overhead stream in said secondary rectifying zone at a temperature no higher than 120° C., removing a second overhead stream containing impurities more volatile than dichloroacetaldehyde, removing a second residue stream containing dichloroacetaldehyde and chloral free of more volatile impurities, passing said second residue stream into a tertiary rectifying zone, distilling said second residue stream in said tertiary rectifying zone at an overhead pressure no higher than 0.25 atmosphere and removing a purified dichloroacetaldehyde product stream overhead from said tertiary rectifying zone at a temperature no higher than 50° C., said dichloroacetaldehyde product stream having a substantially lower amount of chloral than said second residue stream, and removing a purified chloral stream as residue from said tertiary rectifying zone having substantially lower amounts of dichloroacetaldehyde than said second residue stream.

4. Process of claim 3 wherein said distillation in said secondary rectifying zone is carried out at a temperature of from 60° to 80° C., said distillation in said tertiary rectifying zone is carried out at an overhead pressure of 0.05 to 0.25 atmosphere and at an overhead temperature of 15° to 50° C.

References Cited

UNITED STATES PATENTS 2,615,049  10/1952  Pianfetti et al.

LEON ZITVER, Primary Examiner

R. H. LILES, Assistant Examiner

U.S. Cl. X.R.

203—74, 91